US012323313B2

United States Patent
Song (10) Patent No.: US 12,323,313 B2
(45) Date of Patent: Jun. 3, 2025

(54) REAL-TIME NETWORK-WIDE LINK LATENCY MONITORING WITH IN-NETWORK INT SAMPLING AND AGGREGATION

(71) Applicant: Huawei Technologies Co., Ltd., Guandong (CN)

(72) Inventor: Haoyu Song, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 18/154,719

(22) Filed: Jan. 13, 2023

(65) Prior Publication Data

US 2023/0171175 A1    Jun. 1, 2023

Related U.S. Application Data

(63) Continuation of application No. PCT/US2020/042207, filed on Jul. 15, 2020.

(51) Int. Cl.
| | |
|---|---|
| *H04L 43/0852* | (2022.01) |
| *H04L 41/04* | (2022.01) |
| *H04L 41/34* | (2022.01) |
| *H04L 43/022* | (2022.01) |
| *H04L 45/745* | (2022.01) |

(52) U.S. Cl.
CPC .......... *H04L 43/0852* (2013.01); *H04L 41/04* (2013.01); *H04L 41/34* (2022.05); *H04L 43/022* (2013.01); *H04L 45/745* (2013.01)

(58) Field of Classification Search
CPC ..... H04L 43/0852; H04L 41/34; H04L 41/04; H04L 43/022; H04L 45/745

USPC .......................................................... 370/252
See application file for complete search history.

(56) References Cited

U.S. PATENT DOCUMENTS

| | | | |
|---|---|---|---|
| 9,954,756 B2 * | 4/2018 | Sella ...................... | H04L 43/12 |
| 10,686,671 B1 * | 6/2020 | Mozumdar ............. | H04L 41/12 |
| 10,911,355 B2 * | 2/2021 | Dontula Venkata ........................ | H04L 12/4641 |
| 10,924,352 B2 * | 2/2021 | Hira ..................... | H04L 41/0853 |

(Continued)

FOREIGN PATENT DOCUMENTS

| | | | | |
|---|---|---|---|---|
| WO | 2019206862 A1 | 10/2019 | | |
| WO | WO-2024206146 A1 * | 10/2024 | ......... | H04L 41/0894 |

OTHER PUBLICATIONS

Brockners F et al "Data Fields for In-situ OAM," draft-ietf-ippm-ioam-data-10.txt, IPPM, Internet-Draft, Jul. 13, 2020, XP015140715, total 36 pages.

(Continued)

*Primary Examiner* — Melvin H Pollack
(74) *Attorney, Agent, or Firm* — Conley Rose, P.C.

(57) ABSTRACT

A method performed by a network device along a data path for real-time network-wide link latency monitoring. The method includes receiving a packet; incrementing a packet counter; determining whether the packet counter is at least equal to a silent period value (M) when a sampling cycle flag is not set; determining whether the packet includes an existing in-band network telemetry (INT) header when the packet counter is at least equal to the silent period value (M); inserting INT data into the existing INT header of the packet and setting the sampling cycle flag when the packet includes the existing INT header; and forwarding the packet along a data path towards a destination device.

21 Claims, 6 Drawing Sheets

(56) References Cited

U.S. PATENT DOCUMENTS

| | | | |
|---|---|---|---|
| 11,102,121 B2 * | 8/2021 | Indiresan | H04L 45/7453 |
| 11,122,491 B2 * | 9/2021 | Pignataro | H04L 47/28 |
| 11,283,704 B2 * | 3/2022 | Indiresan | H04L 63/1458 |
| 11,343,162 B2 * | 5/2022 | Rangarajan | H04L 43/12 |
| 11,381,504 B2 * | 7/2022 | Kim | H04L 49/1546 |
| 11,405,325 B2 * | 8/2022 | Karuppiah | H04L 47/365 |
| 11,411,802 B2 * | 8/2022 | Hsu | H04L 41/5009 |
| 11,552,870 B2 * | 1/2023 | Arneja | H04L 41/0886 |
| 11,558,283 B2 * | 1/2023 | Kikkawa | H04L 45/34 |
| 11,616,718 B2 * | 3/2023 | Hu | H04L 69/22 370/392 |
| 11,671,483 B2 * | 6/2023 | Julien | H04L 47/2441 709/226 |
| 11,777,853 B2 * | 10/2023 | Hira | H04L 43/0876 370/235 |
| 11,888,738 B2 * | 1/2024 | Chitalia | H04L 41/22 |
| 11,895,000 B2 * | 2/2024 | Nishiki | H04L 12/40189 |
| 12,010,000 B2 * | 6/2024 | Wang | H04L 43/10 |
| 12,074,799 B2 * | 8/2024 | Srinivasan | H04L 43/106 |
| 2019/0222442 A1 | 7/2019 | Wei et al. | |
| 2019/0327174 A1 * | 10/2019 | LaVigne | H04L 47/41 |
| 2020/0186465 A1 | 6/2020 | Dontula Venkata et al. | |
| 2020/0195553 A1 * | 6/2020 | Yigit | H04L 43/50 |
| 2020/0280518 A1 * | 9/2020 | Lee | H04L 47/115 |
| 2024/0171498 A1 * | 5/2024 | Rangarajan | H04L 45/245 |

OTHER PUBLICATIONS

Zseby T, et al., "Sampling and Filtering Techniques for IP Packet Selection," RFC 5475, Networking Group, Mar. 1, 2009, XP015065544, total 46 pages.

Kim Youngho et al: "Selective In-band Network Telemetry for Overhead Reduction," 2018 IEEE 7th International Conference On Cloud Networking (Cloudnet), IEEE, Oct. 22, 2018, pp. 1-3, XP033457643.

Tian Pan, "INT-Path: Towards Optimal Path Planning for In-band Network-Wide Telemetry," IEEE Infocom 2019—IEEE Conference on Computer Communications, Paris, France, 2019, 9 pages.

F. Brockners, et al., "Data Fields for In-situ OAM," draft-ietf-ippm-ioam-data-09, IPPM, Internet-Draft, Mar. 8, 2020, 43 pages.

H. Song, et al., "In-situ Flow Information Telemetry," draft-song-opsawg-ifit-framework-12, OPSAWG, Internet-Draft, Apr. 14, 2020, 28 pages.

T. Pan, et al., "In-band Network-Wide Telemetry," draft-tian-bupt-inwt-mechanism-policy-00, BUPT, Internet-Draft, Apr. 28, 2020, 15 pages.

* cited by examiner

REAL-TIME NETWORK-WIDE LINK LATENCY MONITORING WITH IN-NETWORK INT SAMPLING AND AGGREGATION

CROSS-REFERENCE TO RELATED APPLICATIONS

This patent application is a continuation of International Application No. PCT/US2020/042207 filed on Jul. 15, 2020, by Futurewei Technologies, Inc., and titled "Real-time Network-wide Link Latency Monitoring with In-Network INT Sampling and Aggregation," which is hereby incorporated by reference.

TECHNICAL FIELD

The present disclosure relates to network communications, and more specifically to systems and methods for real-time network-wide link latency monitoring with in-network in-band network telemetry (INT) sampling and aggregation.

BACKGROUND

Network visibility is important for network performance monitoring, troubleshooting, and optimization. Real-time link latency can be used by routing algorithm to compute the best routes. However, it is not easy to acquire the network-wide link latency with low cost.

In-band Network Telemetry (e.g., "in-situ" Operations, Administration, and Maintenance (IOAM)) allows a packet to include a special header that instructs the network devices on the packet's forwarding path to collect specific data such as packet arrival/departure timestamp. The packet latency on a link (including both the processing delay and link propagation delay) can be accurately acquired by using the two timestamps from the two network devices on both ends of the link, when the network clock is synchronized.

Based on INT, ae minimum number of paths that achieve network-wide coverage is determined. Dedicated source-routing probing packets are then injected with INT that traverse these paths and collect the link latency data. However, any topology changes or link/node failures require recalculation. In addition, the injected probing packets consume extra bandwidth and undergo extra and different processing which can bias the measurement results. Thus, although enabling INT on all user traffic at the network ingress can achieve network-wide coverage, it is cost prohibitive. Conversely, if only a sample of the traffic is used to enable INT, there is no guarantee that network-wide coverage is achieved and data redundancy cannot be eliminated due to the lack of knowledge of the traffic's forwarding path.

One alternative approach is to enable 1-hop INT on each link. At each egress port of a network device, the outgoing packets are sampled and INT is enabled on the sampled packets. At each ingress port of a network device, the INT data and the link latency data is exported to a telemetry data collector. The drawback of this approach is that it generates too many data export packets, which can overwhelm the data collector. In addition, the INT header encapsulation and decapsulation incurs a cost.

SUMMARY

The disclosed embodiments seek to resolve or mitigate one or more current issues associated with real-time network-wide link latency monitoring using in-network in-band network telemetry (INT). In particular, the disclosed embodiments provide a low-cost approach to achieve real-time network-wide link latency monitoring with in-network INT sampling and aggregation. In an embodiment, at each egress port of a network device, for every pre-defined window of outgoing packets, if no packet includes an INT header, a packet is selected and an INT header and data is inserted into the selected packet; otherwise, if a packet already includes an INT header, then INT data is inserted into this packet. At an egress network device (i.e., network edge), the network edge will terminate the INT and export the aggregated INT data to a network management system. The disclosed embodiments guarantee network-wide coverage, while reducing the network processing load due to the reduction in the number of INT headers insertion within the network and removal (performed at network egress). In addition, the disclosed embodiments reduce the total number of exported data packets. Further, the disclosed embodiments utilize a sampling rate that adapts to the link load and can be used to infer link bandwidth utilization.

A first aspect relates to a method performed by a network device along a data path for real-time network-wide link latency monitoring. The method receives a packet by the network device. The method increments a packet counter value by one. The method determines whether a sampling cycle flag is set to indicate that a sampling has occurred during a sampling cycle. The method determines whether the packet counter value is at least equal to a silent period value (M) when the sampling cycle flag is not set. The method determines whether the packet includes an existing in-band network telemetry (INT) header when the packet counter value is at least equal to the silent period value (M). The method inserts INT data into the existing INT header of the packet and setting the sampling cycle flag when the packet includes the existing INT header. The method forwards the packet along a data path towards a destination device.

The first aspect guarantees that one packet includes INT data per a predefined sampling period or cycle (N). Additionally, the first aspect minimizes the number of times that it has to insert a new INT header into a packet, thus increasing efficiency.

Optionally, in any of the preceding aspects, another implementation of the aspect provides that the packet counter value equals a sampling cycle value (N) when the packet does not include the existing INT header. The method inserts a new INT header and the INT data into the new INT header of the packet, and resetting the packet counter value when the packet counter value equals the sampling cycle value (N).

Optionally, in any of the preceding aspects, another implementation of the aspect provides determining whether the packet counter value equals the sampling cycle value (N) when the sampling cycle flag is set to indicate that the sampling has occurred during the sampling cycle. The method resets the sampling cycle flag and the packet counter value when the packet counter value equals the sampling cycle value (N).

Optionally, in any of the preceding aspects, another implementation of the aspect provides forwarding the packet along the data path towards the destination device without determining whether the packet includes the existing in-band network telemetry (INT) header when the packet counter value is less than the silent period value (M).

Optionally, in any of the preceding aspects, another implementation of the aspect provides that at least one of the sampling cycle value (N) and the silent period value (M) is user-configurable.

A second aspect relates to a method performed by a network device along a data path for real-time network-wide link latency monitoring. The method receives a packet by the network device. The method increments a packet counter value by one. The method determines whether the packet counter value is at least a first predefined value (X). The method determines whether the packet includes an existing INT header when the packet counter value is at least the first predefined value (X). The method inserts INT data into the existing INT header of the packet and resetting the packet counter value when the packet includes the existing INT header. The method forwards the packet along a data path towards a destination device.

The second aspect ensures the INT sampling rate is between {1/X, 1/Y} at each link. On a particular link, the next latency data is collected at least X packet later and at most Y packet later. Both X and Y can be configurable based on the measurement accuracy requirement.

Optionally, in any of the preceding aspects, another implementation of the aspect provides determining whether the packet counter value equals a second predefined value (Y) when the packet counter value is at least the first predefined value (X) and the packet does not include the existing INT header. The method inserts a new INT header and INT data into the new INT header of the packet, and resets the packet counter value when the packet counter value equals the second predefined value (Y).

A third aspect relates to a method performed by a network device along a data path for real-time network-wide link latency monitoring. The method receives a packet by the network device. The method increments a packet counter value by one. The method determines whether a sampling cycle flag is set to indicate that a sampling has occurred during a sampling cycle. The method determines whether the packet includes an existing in-band network telemetry (INT) header when the sampling cycle flag is not set. The method inserts INT data into the existing INT header of the packet and setting the sampling cycle flag when the packet includes the existing INT header. The method forwards the packet along a data path towards a destination device.

The third aspect ensures the average INT sampling rate is 1/N at each link, although the distance between two latency data sampling can be 1 to N packets. Although the sampling jitter is higher, this aspect provides an improved INT data aggregation effect.

Optionally, in any of the preceding aspects, another implementation of the aspect provides determining whether the packet counter value equals a sampling cycle value (N) when the sampling cycle flag is not set and the packet does not include the existing INT header. The method inserts a new INT header and the INT data into the new INT header of the packet, and resets the packet counter value when the packet counter value equals the sampling cycle value (N).

Optionally, in any of the preceding aspects, another implementation of the aspect provides determining whether the packet counter value equals the sampling cycle value (N) when the sampling cycle flag is set. The method resets the sampling cycle flag and the packet counter value when the packet counter value equals the sampling cycle value (N).

A fourth aspect relates to a method performed by an egress network device at a network edge along a data path for real-time network-wide link latency monitoring. The method receives an INT-enabled data packet at the egress network device at the network edge. The method deletes the INT data and the INT header from the INT-enabled data packet to generate a non-INT data packet. The method exports the INT data to a telemetry data collector. The method forwards the non-INT data packet along the data path towards a destination device.

The fourth aspect guarantees network-wide coverage (i.e., full coverage and no redundancy), while reducing the network processing load. For example, the fourth aspect reduces the total number of exported data packets.

A fifth aspect relates to a network node that includes memory storing instructions; a processor coupled to the memory, wherein the processor is configured to execute the instructions to cause the network node to perform any of the preceding aspects.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosed embodiments seek to resolve or mitigate one or more current issues associated with real-time network-wide link latency monitoring using in-network in-band network telemetry (INT). In particular, the disclosed embodiments provide a low-cost approach to achieve real-time network-wide link latency monitoring with in-network INT sampling and aggregation. In an embodiment, at each egress port of a network device, for every pre-defined window of outgoing packets, if no packet includes an INT header, a packet is selected and an INT header and data is inserted into the selected packet; otherwise, if a packet already includes an INT header, then INT data is inserted into this packet. At an egress network device (i.e., network edge), the network edge will terminate the INT and export the aggregated INT data to a network management system.

The disclosed embodiments guarantee network-wide coverage, while reducing the network processing load due to the reduction in the number of INT headers insertion within the network and removal (performed at network egress). In addition, the disclosed embodiments reduce the total number of exported data packets. Further, the disclosed embodiments utilize a sampling rate that adapts to the link load and can be used to infer link bandwidth utilization.

Figure 1:
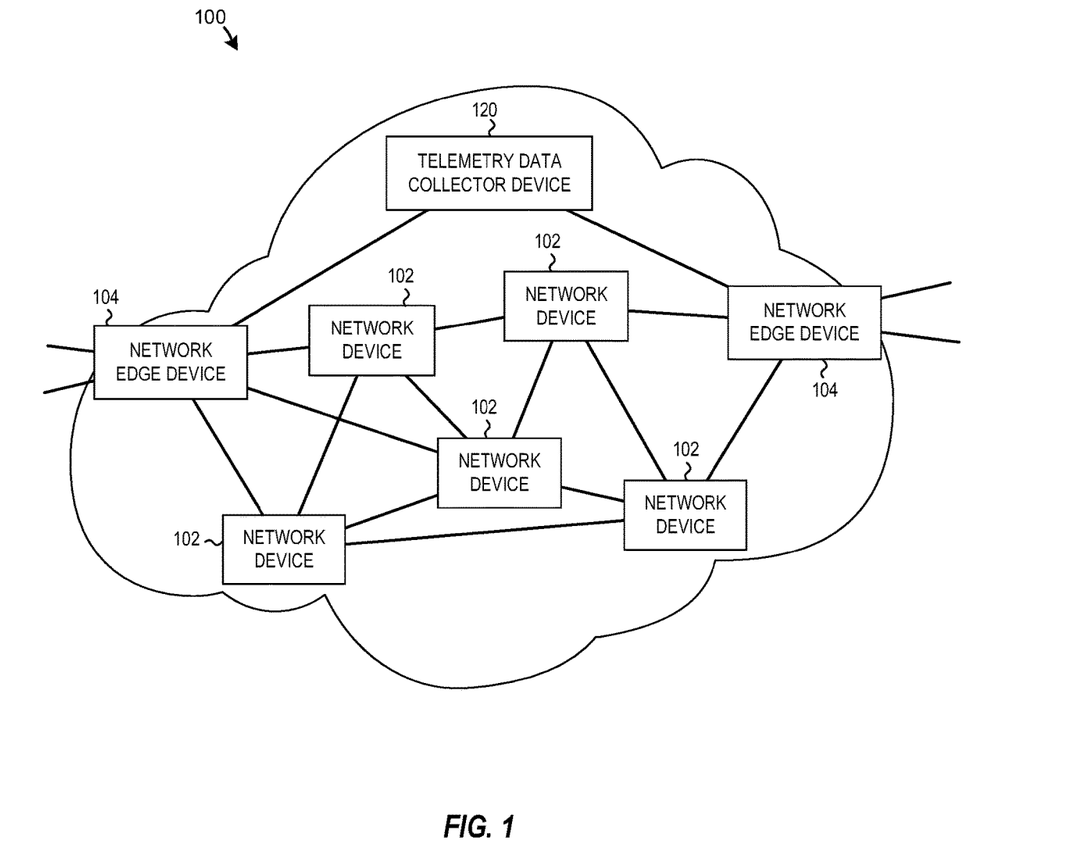
FIG. 1 is a schematic diagram illustrating a network according to an embodiment of the present disclosure.

FIG. 1 is a schematic diagram illustrating a network 100 according to an embodiment of the present disclosure. The network 100 includes a plurality of network devices 102 including one or more network edge devices 104. The network devices 102 may be configured to route data packets across various network paths in the network 100. The network edge devices 104 are network nodes that are located on the edge of the network 100. In the depicted embodiment, the network 100 also includes a telemetry data collector device 120. A telemetry data collector device 120 is configured to collect data related to the network's performance from the network edge devices 104 for storage and analysis. While only two network edge devices 104 are shown here in FIG. 1, it should be understood that alternative embodiments may readily include a greater number of such edge devices that provide telemetry data to telemetry data collector device 120.

Figure 2:
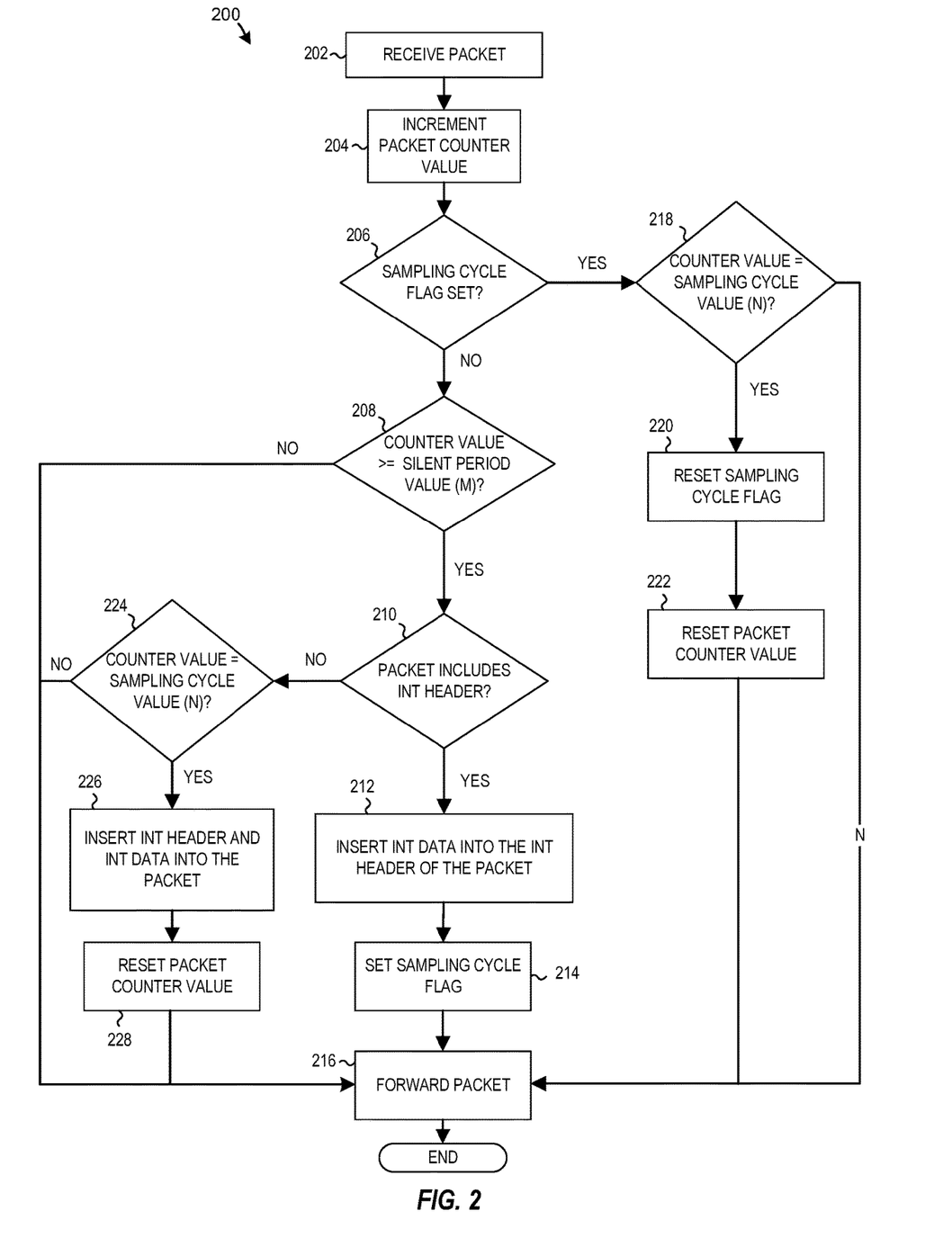
FIG. 2 is a flowchart illustrating a method for real-time network-wide link latency monitoring with in-network INT sampling according to an embodiment of the present disclosure.

FIG. 2 is a flowchart illustrating a method 200 for performing real-time network-wide link latency monitoring with in-network INT sampling according to an embodiment of the present disclosure. The method 200 can be performed by any network device along a data path such as network devices 102 in FIG. 1. In an embodiment, the method 200 is performed at each egress port of a network device. The method 200 begins at step 202 with the network device receiving a packet. The method 200, at step 204, includes the step of incrementing a packet counter value. At step 206, the method 200 includes the step of determining whether a sampling cycle flag is set (e.g., cycle flag set to 0/1 or true/false). The sampling cycle flag indicates whether a sampling (i.e., INT data inserted into a packet) has been performed for a predefined sampling period or cycle (N).

If the sampling cycle flag is set, meaning that a sampling has already been performed for the predefined sampling cycle, the method 200, at step 218, includes the step of determining whether the packet counter value equals the value of the sampling cycle (N) (i.e., whether the maximum number of packets in the sampling cycle has been reached). When the packet counter value equals the value of the sampling cycle (N), the method 200 includes the step of resetting the sampling cycle flag (e.g., back to false or 0) at step 220, and the step of resetting the packet counter value to 0 at step 222. The method 200 includes the step of forwarding the packet at step 216, and then the method 200 terminates thereafter.

If, at step 206, the sampling cycle flag is not set, meaning that a sampling has not been performed for the predefined sampling cycle, the method 200, at step 208, includes the step of determining whether the packet counter value is greater than or equal to a predefined silent period (M). The predefined silent period (M) is used to ignore the first M number of packets in the sampling cycle (N).

In certain embodiments, both the values of M (silent period) and N (sampling cycle) are configurable. As stated above, the value of N specifies the sampling rate for each link. The value of M specifies the tradeoff between sampling jitter and piggyback efficiency. For example, the biggest possible jitter occurs when M=0 because two samplings from two cycles may be very close. The best piggyback efficiency also occurs when M=0 because it provides the largest possibility to find a packet that has already had an INT header. In contrast, no jitter occurs when M is set to the maximum value of M=N−1 because it would guarantee a sample is taken exactly every N packets. However, this would provide the worst piggyback efficiency because if the $N^{th}$ packet does not have an INT header, then a new header will have to be added to the packet. Thus, in practice, a value of M can be selected to balance the jitter and efficiency.

If, at step 208, the packet counter value is greater than or equal to a predefined silent period (M), meaning that enough packets in the sampling cycle have been ignored, the method 200, at step 210, includes the step of determining whether the packet includes an INT header. If the packet does include an INT header, the method 200 at step 212 includes the step of inserting INT data into the INT header of the packet. At step 214, the method 200 includes the step of setting the sampling cycle flag (e.g., to true or one). The method 200 includes the step of forwarding the packet at step 216, and then the method 200 terminates thereafter.

If, at step 210, the packet does not include an INT header, the method 200 at step 224 includes the step of determining whether the packet counter value equals the value of the sampling cycle (N) (i.e., is this the last packet in the sampling cycle?). When the packet counter value equals the value of the sampling cycle (N), the method 200, at step 226, includes the step of inserting a new INT header and INT data into the packet. The method 200, at step 228, includes the step of resetting the packet counter value to 0. The method 200 includes the step of forwarding the packet at step 216, and then the method 200 terminates thereafter. If, at step 224, the packet counter value is not equal to the value of the sampling cycle (N), the method 200, at step 216, includes the step of forwarding the packet and then the method 200 terminates thereafter.

In summary, the method 200 when executed by a network device guarantees that one packet includes INT data per a predefined sampling period or cycle (N). Additionally, the method 200 includes the use of a predefined silent period (M). In each sampling cycle, the method 200 is configured to ignore the first M number of packets. After the M packets, the method 200 is configured to examine the next N−M packets. If a packet with INT header is found, the method 200 is configured to piggyback the local data on this packet, and no other packet will be examined for the remainder of this sampling cycle. If at the end of the sampling cycle, no packet is found to have an INT header, then the method 200 is configured to add the INT header and local data to the $N^{th}$ packet. This ensures that the method 200 when executed by a network device minimizes the number of times that a new INT header is inserted into a packet, thus increasing efficiency. As will be further described in FIG. 5, in an embodiment, egress nodes at domain edge can be configured to collect and export all the data from the packets with an INT header to a network management/monitoring system.

Figure 3:
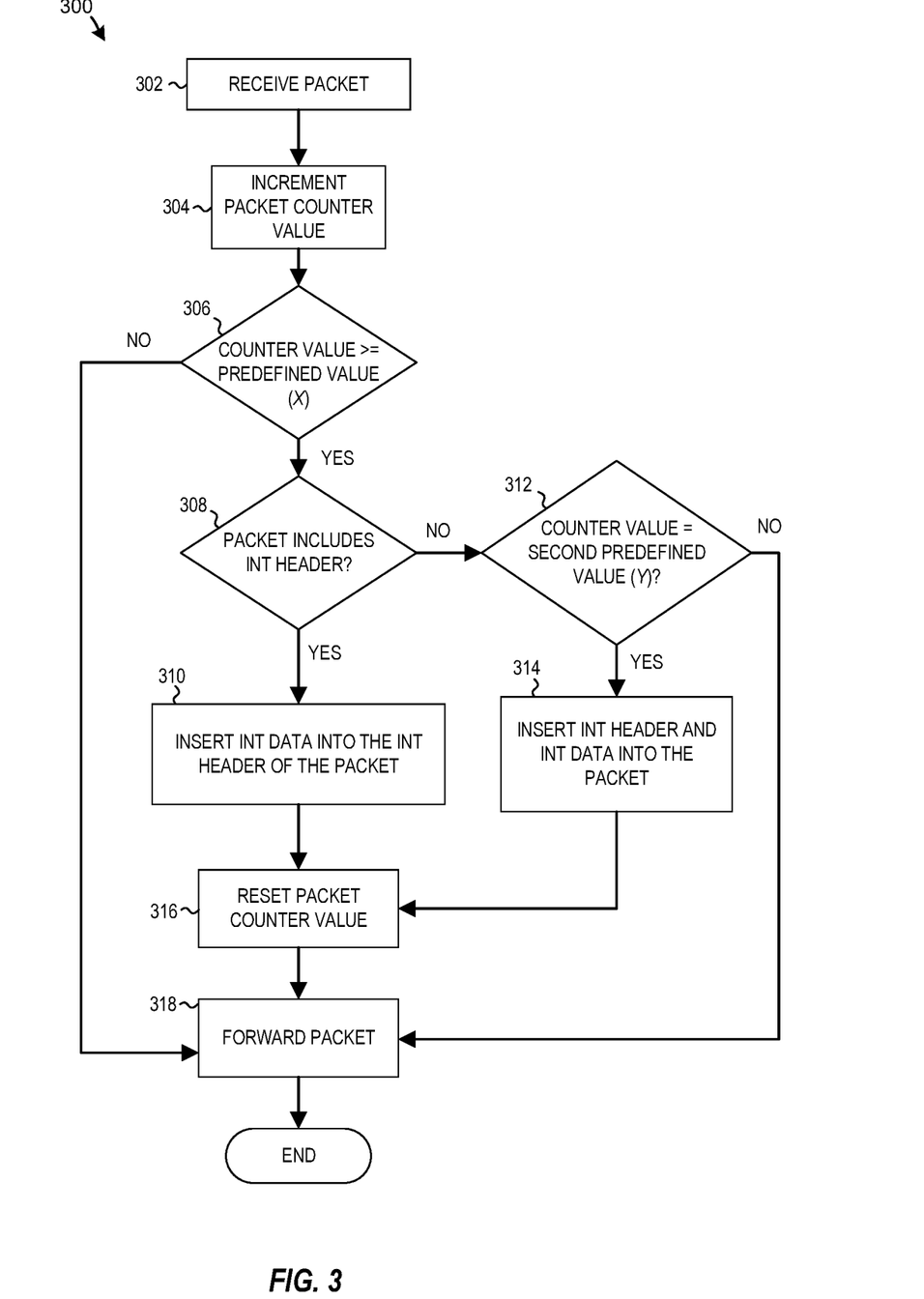
FIG. 3 is a flowchart illustrating a method for real-time network-wide link latency monitoring with in-network INT sampling according to another embodiment of the present disclosure.

FIG. 3 is a flowchart illustrating a method 300 for real-time network-wide link latency monitoring with in-network INT sampling according to another embodiment of the present disclosure. The method 300 can be performed by any network device along a data path such as network devices 102 in FIG. 1. In an embodiment, the method 300 is performed at each egress port of a network device. The method 300 is configured to use a packet counter value and two thresholds 0<X<Y. The method 300, at step 302, includes the step of receiving a packet. In an embodiment, at each egress port on a device, the method 300, at step 304, includes the step of increasing the packet counter value by 1. In the depicted embodiment, when the packet counter value reaches X, the method 300 includes the step of determining whether a packet already has an INT header inserted. Thus, at step 306, the method 300 includes the step of determining whether the packet counter value is greater than or equal to the predefined value of X. When the packet counter value is less than the predefined value of X, the method 300 includes the step of forwarding the packet at step 318, and then the method 300 terminates thereafter.

When the packet counter value is greater than or equal to X, the method 300, at step 308, includes the step of examining the packet to determine whether the packet includes an INT header. If the packet includes an INT header, the method 300, at step 310, includes the step of inserting INT data into the INT header of the packet. The method 300, at step 316, includes the step of resetting the packet counter value to zero. The method 300 includes the step of forwarding the packet at step 318, and then the method 300 terminates thereafter.

When the packet counter value, at step 306, is greater than or equal to X, but the packet does not include an INT header as determined at step 308, then the method 300, at step 312, includes the step of determining whether the packet counter value equals Y. When the packet counter value is less than Y, the method 300 includes the step of forwarding the packet at step 318 and then the method 300 terminates thereafter. If, at step 312, the packet counter value equals Y, then the method 300, at step 314, includes the step of inserting a new INT header and INT data into the packet. The method 300, at step 316, includes the step of resetting the packet counter value to zero. The method 300 includes the step of forwarding the packet at step 318, and then the method 300 terminates thereafter.

Accordingly, the method 300 when executed by a network device ensures the INT sampling rate is between {1/X, 1/Y} at each link. In an embodiment, both X and Y are configurable based on the measurement accuracy requirement. In this embodiment, on a link, the next latency data is collected at least X packet later and at most Y packet later.

Figure 4:
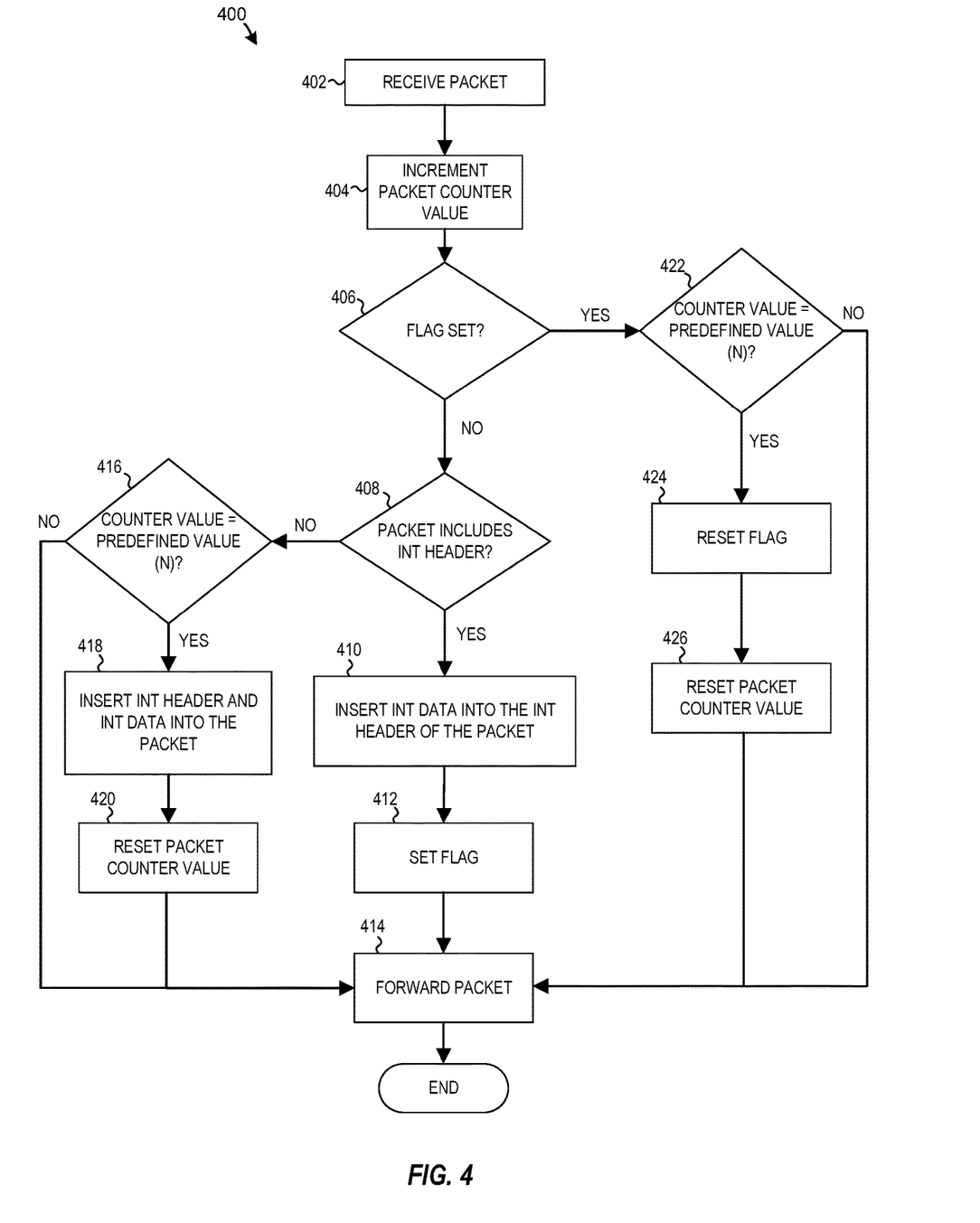
FIG. 4 is a flowchart illustrating a method for real-time network-wide link latency monitoring with in-network INT sampling according to another embodiment of the present disclosure.

FIG. 4 is a flowchart illustrating a method 400 for real-time network-wide link latency monitoring with in-network INT sampling according to another embodiment of the present disclosure. The method 400 can be performed by any network device along a data path such as network devices 102 in FIG. 1. In an embodiment, the method 400 is performed at each egress port of a network device. The method 400 differs from the method 200 in that the method 400 is not configured to utilize a predefined silent period (M). Instead, the method 400 is configured to only use a predefined sampling period or cycle (N). The method 400 includes the step of receiving a packet at step 402. The method 400 includes the step of incrementing the packet counter value at step 404. At step 406, the method 400 includes the step of determining whether the sampling cycle flag is set (e.g., to true or one), which would indicate that a sampling has already occurred during the current cycle. When the sampling cycle flag is not set, the method 400, at step 408, includes the step of determining whether the packet includes an INT header. When the packet is determined to include an INT header, the method 400, at step 410, includes the step of inserting INT data into the INT header of the packet. The method 400, at step 412, includes the step of setting the sampling cycle flag. The method 400, at step 414, includes the step of forwarding the packet, and then the method 400 terminates thereafter.

When, at step 406, the sampling cycle flag is not set and, at step 408, the packet is determined to not include an INT header, the method 400, at step 416, includes the step of determining whether the packet counter value equals the value of the sampling cycle (N). When the packet counter value is not equal to N, then the method 400 includes the step of forwarding the packet at step 414 and then the method 400 terminates thereafter. When, at step 416, the packet counter value is determined to be equal to N, meaning that this is the last packet in the cycle and a sampling has not been taken during the current cycle, then the method 400, at step 418, includes the step of inserting a new INT header into the packet and inserting INT data into the new INT header of the packet. At step 420, the method 400 includes the step of resetting the packet counter value. At step 414, the method 400 includes the step of forwarding the packet and then the method 400 terminates thereafter.

When, at step 406, the sampling cycle flag is determined to be set, the method 400, at step 422, includes the step of determining whether the packet counter value equals the value of the sampling cycle (N). When the packet counter value is not equal to N (i.e., packet count is less than N), then the method 400, at step 414, includes the step of forwarding the packet and then the method 400 terminates thereafter. However, if at step 422, the packet counter value is determined to be equal to N, the method 400, at step 424, includes the step of resetting the sampling cycle flag (e.g., set to false or zero). The method 400, at step 426, includes the step of resetting the packet counter value to zero. At step 414, the method 400 includes the step of forwarding the packet and then the method 400 terminates thereafter.

As shown above, the method 400 when executed by a network device ensures the average INT sampling rate is 1/N at each link, although the distance between two latency data sampling can be 1 to N packets. Although the sampling jitter is higher, this embodiment provides an improved INT data aggregation effect.

Figure 5:
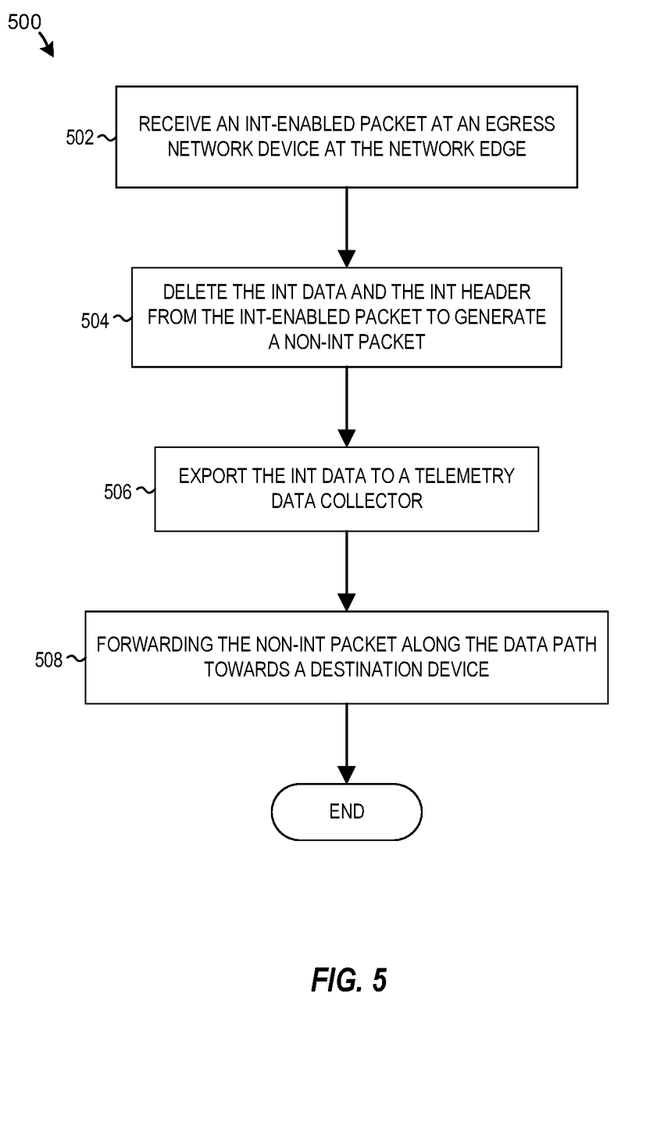
FIG. 5 is a flowchart illustrating a method for real-time network-wide link latency monitoring with in-network INT sampling and aggregation according to an embodiment of the present disclosure.

FIG. 5 is a flowchart illustrating a method 500 for real-time network-wide link latency monitoring with in-network INT sampling and aggregation according to an embodiment of the present disclosure. In an embodiment, the method 500 is performed by an egress node at a domain edge, such as network edge devices 104 in FIG. 1, to collect and export all the data from the packets with INT header to a network management/monitoring system such as the telemetry data collector device 120 in FIG. 1. The method 500 begins, at step 502, by receiving an INT-enabled data packet at the egress network device at the network edge. The method 500, at step 504, deletes the INT data and the INT header from the INT-enabled data packet to generate a non-INT data packet. The method 500, at step 506, exports the INT data to a telemetry data collector as well as the data of the egress node. The method 500, at step 508, forwards the non-INT data packet along the data path towards a destination device, and terminates thereafter.

In an embodiment, for any link in the network, if a packet is selected to insert INT data, the sender device A will insert the packet's ingress timestamp T1 at A, and the receiver device B will insert the packet's ingress timestamp T2 at B. The link latency T=T2−T1. The link latency T can be calculated either by the egress node or by the telemetry data collector.

Figure 6:
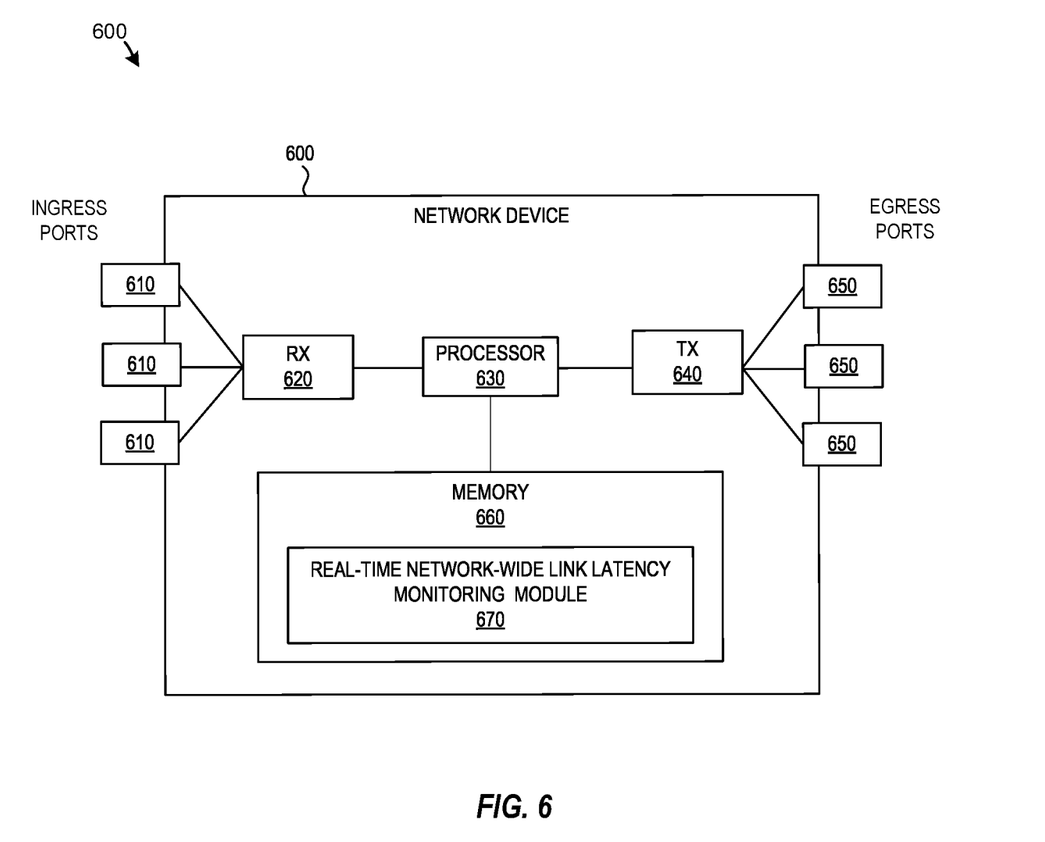
FIG. 6 is a schematic diagram illustrating a network element according to an embodiment of the present disclosure.

FIG. 6 is a schematic diagram illustrating a network device 600 according to an embodiment of the present disclosure. The network device 600 can be any network node such as, but not limited to, any router, switch, and controller, which are used by the service providers around the world. In accordance with the disclosed embodiments, the network device 102, and network edge device 104, and telemetry data collector device 120 in FIG. 1 may be implemented using the network device 600.

In the depicted embodiment, the network device 600 has one or more processor 630 or other processing means (e.g., central processing unit (CPU)) to process instructions. The processor 630 may be implemented as one or more CPU chips, cores (e.g., as a multi-core processor), field-programmable gate arrays (FPGAs), application specific integrated circuits (ASICs), and digital signal processors (DSPs). The processor 630 is communicatively coupled via a system bus with various components of the network device 600 including, but not limited to, receiver units (RX) 620, transmitter units (TX) 640, and memory 660. The processor 630 can be configured to execute instructions stored in the memory 660. Thus, the processor 630 provides a means for performing any computational, comparison, determination, initiation, configuration, or any other action corresponding to the claims when the appropriate instruction is executed by the processor.

In an embodiment, the RX 620 or receiving means is configured to receive data via ingress ports 610. Similarly, the TX 640 or transmitting means is configured to transmit data via egress ports 650.

The memory 660 or data storing means stores instructions and various data. The memory 660 can be any type of or combination of memory components capable of storing data and/or instructions. For example, the memory 660 can include volatile and/or non-volatile memory such as read-only memory (ROM), random access memory (RAM), ternary content-addressable memory (TCAM), and/or static random-access memory (SRAM). The memory 660 can also include one or more disks, tape drives, and solid-state drives. In some embodiments, the memory 660 can be used as an over-flow data storage device to store programs when such programs are selected for execution, and to store instructions and data that are read during program execution. In some embodiments, the memory 660 can be memory that is integrated with the processor 630.

In an embodiment, the memory 660 stores a real-time network-wide link latency monitoring module 670. The real-time network-wide link latency monitoring module 670 includes data and executable instructions for implementing the disclosed embodiments. For instance, the real-time network-wide link latency monitoring module 670 can include instructions for implementing the methods described in FIGS. 2-5. The inclusion of the real-time network-wide link latency monitoring module 670 substantially improves the functionality of the network device 600 by enabling real-time network-wide link latency monitoring with in-network INT sampling and aggregation, which, among other things, guarantees network-wide coverage, reduces the total number of exported data packets, reduces the network device processing load by reducing the number of INT headers insertion and removal. In addition, the sampling rate adapts to the link load and can be used to infer link bandwidth utilization.

As described herein, the disclosed embodiments provide a low-cost approach to achieve real-time network-wide link latency monitoring with in-network INT sampling and aggregation. The disclosed embodiments guarantees network-wide coverage (i.e., full coverage and no redundancy), while reducing the network processing load. For example, the disclosed embodiments reduce the total number of exported data packets. Thus, the disclosed embodiments provide low cost and low impact real-time network-wide link latency monitoring. Further, the disclosed embodiments utilize a sampling rate that adapts to the link load and can be used to infer link bandwidth utilization. The disclosed embodiments can be employed as part of the In-situ Flow Information Telemetry (iFIT) framework for optimized telemetry technique (i.e., smart sampling and data reduction).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention claimed is:

1. A method for real-time network-wide link latency monitoring along a data path performed by a network device, the method comprising:
   receiving a packet by the network device;
   incrementing a packet counter value by one;
   determining whether a sampling cycle flag is set to indicate that a sampling has occurred during a sampling cycle;
   determining whether the packet counter value is at least equal to a silent period value (M) when the sampling cycle flag is not set;
   determining whether the packet includes an existing in-band network telemetry (INT) header when the packet counter value is at least equal to the silent period value (M);
   inserting INT data into the existing INT header of the packet and setting the sampling cycle flag when the packet includes the existing INT header; and
   forwarding the packet along the data path towards a destination device when the INT data has been inserted into the existing INT header of the packet and the sampling cycle flag has been set.

2. The method of claim 1, further comprising:
  determining whether the packet counter value equals a sampling cycle value (N) when the packet does not include the existing INT header; and
  inserting a new INT header into the packet, inserting the INT data into the new INT header, and resetting the packet counter value when the packet counter value equals the sampling cycle value (N).

3. The method of claim 2, further comprising forwarding the packet along the data path towards the destination device when the new INT header has been inserted into the packet, the INT data has been inserted into the new INT header, and the packet counter value has been reset.

4. The method of claim 2, further comprising:
  determining whether the packet counter value equals the sampling cycle value (N) when the sampling cycle flag is set to indicate that the sampling has occurred during the sampling cycle; and
  resetting the sampling cycle flag and the packet counter value when the packet counter value equals the sampling cycle value (N).

5. The method of claim 4, further comprising forwarding the packet along the data path towards the destination device when the sampling cycle flag and the packet counter value have been reset.

6. The method of claim 1, further comprising forwarding the packet along the data path towards the destination device without determining whether the packet includes the existing in-band network telemetry (INT) header when the packet counter value is less than the silent period value (M).

7. The method of claim 2, wherein one or more of the sampling cycle value (N) and the silent period value (M) is user-configurable.

8. A method for real-time network-wide link latency monitoring along a data path performed by a network device, the method comprising:
  receiving a packet by the network device;
  incrementing a packet counter value by one;
  determining whether the packet counter value is at least a first predefined value (X);
  determining whether the packet includes an existing in-band network telemetry (INT) header when the packet counter value is at least the first predefined value (X);
  inserting INT data into the existing INT header of the packet and resetting the packet counter value when the packet includes the existing INT header; and
  forwarding the packet along a data path towards a destination device when the INT data has been inserted into the existing INT header of the packet and the packet counter value has been reset.

9. The method of claim 8, further comprising:
  determining whether the packet counter value equals a second predefined value (Y) when the packet counter value is at least the first predefined value (X) and the packet does not include the existing INT header; and
  inserting a new INT header into the packet, inserting the INT data into the new INT header, and resetting the packet counter value when the packet counter value equals the second predefined value (Y).

10. The method of claim 9, further comprising forwarding the packet along the data path towards the destination device when the new INT header has been inserted into the packet, the INT data has been inserted into the new INT header, and the packet counter value has been reset.

11. A method for real-time network-wide link latency monitoring along a data path performed by a network device, the method comprising:
  receiving a packet by the network device;
  incrementing a packet counter value by one;
  determining whether a sampling cycle flag is set to indicate that a sampling has occurred during a sampling cycle;
  determining whether the packet includes an existing in-band network telemetry (INT) header when the sampling cycle flag is not set;
  inserting INT data into the existing INT header of the packet and setting the sampling cycle flag when the packet includes the existing INT header; and
  forwarding the packet along a data path towards a destination device when the INT data is inserted into the existing INT header and the sampling cycle flag has been set.

12. The method of claim 11, further comprising:
  determining whether the packet counter value equals a sampling cycle value (N) when the sampling cycle flag is not set and the packet does not include the existing INT header; and
  inserting a new INT header into the packet, inserting the INT data into the new INT header, and resetting the packet counter value when the packet counter value equals the sampling cycle value (N).

13. The method of claim 12, further comprising forwarding the packet along the data path towards the destination device when the new INT header has been inserted into the packet, the INT data has been inserted into the new INT header, and the packet counter value has been reset.

14. The method of claim 12, further comprising:
  determining whether the packet counter value equals the sampling cycle value (N) when the sampling cycle flag is set; and
  resetting the sampling cycle flag and the packet counter value when the packet counter value equals the sampling cycle value (N).

15. The method of claim 14, further comprising forwarding the packet along the data path towards the destination device when the sampling cycling flag and the packet counter value have been reset.

16. The method of claim 12, further comprising:
  determining whether the packet counter value equals the sampling cycle value (N) when the sampling cycle flag is set; and
  forwarding the packet along the data path towards the destination device when the packet counter value is not equal to the sampling cycle value (N).

17. A method for real-time network-wide link latency monitoring along a data path performed by an egress network device at a network edge, the method comprising:
  receiving an in-band network telemetry (INT)-enabled data packet at the egress network device at the network edge;
  deleting an INT header and INT data therein from the INT-enabled data packet to generate a non-INT data packet;
  exporting the INT data to a telemetry data collector; and
  forwarding the non-INT data packet along the data path towards a destination device.

18. The method of claim 17, wherein the egress network device and the destination device are in different networks.

19. The method of claim 17, wherein the telemetry data collector is not in communication with the destination device.

20. The method of claim 17, wherein the in-band network telemetry (INT)-enabled data packet is received from an upstream network device, and wherein the upstream network device is an ingress network device or an intermediate network device disposed between the ingress network device and the egress network device.

21. A computer program product comprising instructions that are stored on a computer-readable medium and that, when executed by a processor, cause a network device to:
increment a packet counter value by one when a packet is received;
determine whether a sampling cycle flag is set to indicate that a sampling has occurred during a sampling cycle;
determine whether the packet counter value is at least equal to a silent period value (M) when the sampling cycle flag is not set;
determine whether the packet includes an existing in-band network telemetry (INT) header when the packet counter value is at least equal to the silent period value (M);
insert INT data into the existing INT header of the packet and setting the sampling cycle flag when the packet includes the existing INT header; and
forward the packet along the data path towards a destination device when the INT data has been inserted into the existing INT header of the packet and the sampling cycle flag has been set.

\* \* \* \* \*

UNITED STATES PATENT AND TRADEMARK OFFICE
CERTIFICATE OF CORRECTION

| | | |
|---|---|---|
| PATENT NO. | : 12,323,313 B2 | Page 1 of 1 |
| APPLICATION NO. | : 18/154719 | |
| DATED | : June 3, 2025 | |
| INVENTOR(S) | : Haoyu Song | |

It is certified that error appears in the above-identified patent and that said Letters Patent is hereby corrected as shown below:

On the Title Page

Item (71) Applicant: Delete "Huawei Technologies Co., Ltd., Guangdong (CN)" and insert -- Huawei Technologies Co., Ltd., Shenzhen (CN) --.

Signed and Sealed this
Twenty-second Day of July, 2025

Coke Morgan Stewart
*Acting Director of the United States Patent and Trademark Office*